United States Patent Office 3,100,948
Patented Aug. 20, 1963

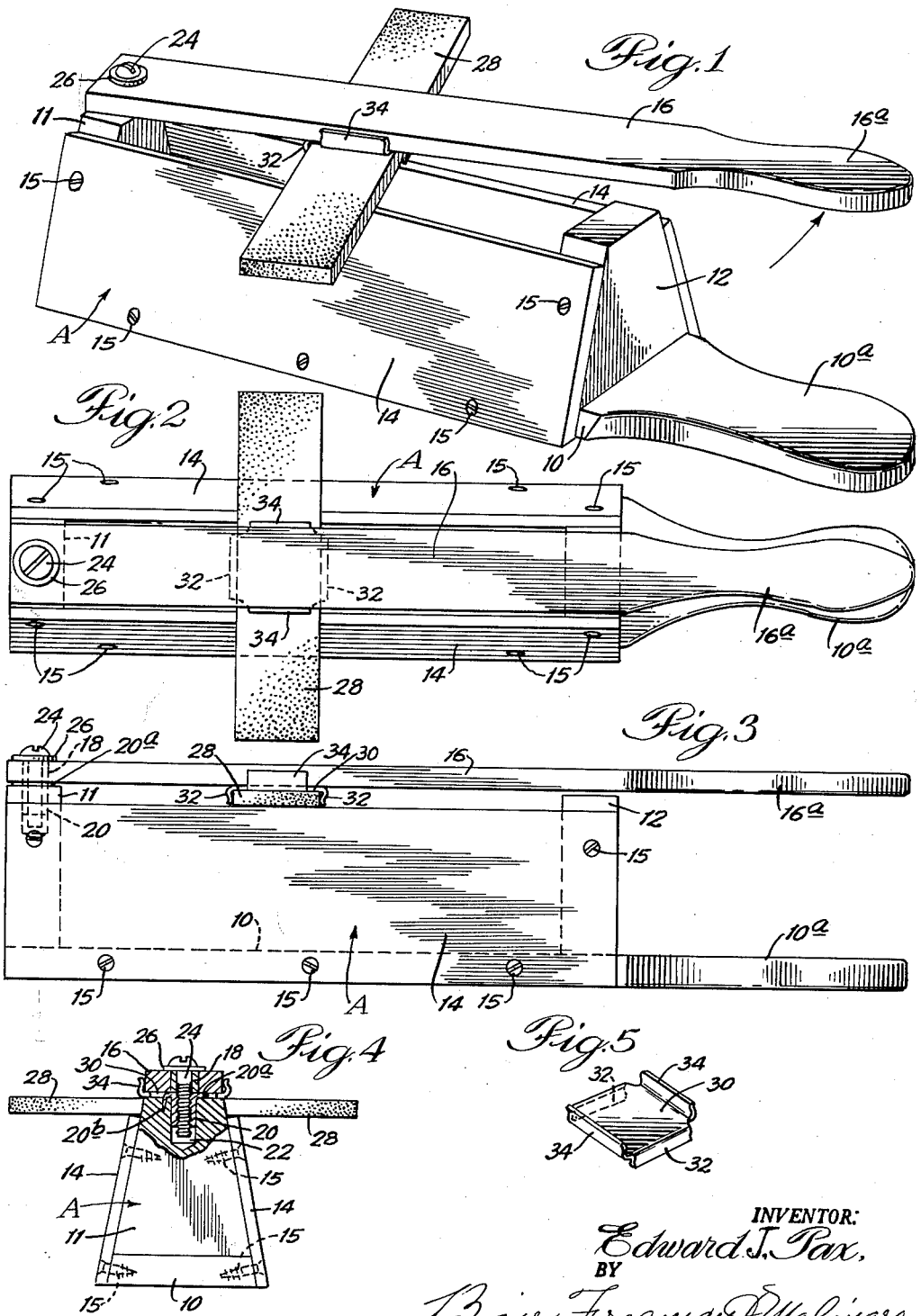

3,100,948
WILD FOWL CALL
Edward J. Tax, 4525 Simpson St., Skokie, Ill.
Filed Aug. 21, 1961, Ser. No. 132,774
1 Claim. (Cl. 46—189)

This invention relates to a device for producing a sound closely simulating the call of a fowl, such as a wild goose. Devices of this type are primarily intended for use by hunters and others for attracting the fowls.

One of the objects of this invention is to provide an improved call device which is capable of closely reproducing mechanically the vocal call of wild fowls.

Another object is to provide an improved call device which may be conveniently supported in a manner so as not to interfere or impair the sound reproduction qualities of the sound box, and which may be simply and easily actuated.

A further object is to provide an improved device of the character indicated which is simple in construction, economical to manufacture, and which is durable and effective in use.

Other objects and advantages of this invention will be apparent from the following description taken in connection with the accompanying drawing, in which:

FIGURE 1 is a perspective view of the improved call device embodying the present invention;

FIGURES 2 and 3 are top plan and side elevational views, respectively, of the improved call device;

FIGURE 4 is a rear end elevational view of the device with portions broken away and shown in section to illustrate the pivotal connection of the actuating arm of the device;

FIGURE 5 is a perspective view of a resilient mounting clip for frictionally supporting an elongated bar of slate in frictional and adjustable relation to the actuator arm.

The sound reproducing device, as represented in the drawing, comprises an upwardly open, elongated sound box indicated generally at A, which is preferably formed of wood such as mahogany, walnut, or other wood having satisfactory sound producing qualities. The sound box is provided with a bottom or base member 10, rear and front end walls 11 and 12, and side walls 14; and the walls are interconnected to the base in any convenient manner, as herein shown by screws 15. The rear and front end walls are generally of truncated, triangular form so that the two side walls 14 incline upwardly toward each other, and by virtue of which the outermost corner of the upper edges of the side walls provide a knife-like edge. It will be noted that the upper ends of the front and rear end walls 11 and 12 terminate a slight distance above the upper edges of the side walls 14, for purposes as will hereafter appear.

An elongated actuator arm 16 is pivoted loosely on top of the rear end wall 11. The pivot connection is provided by a sleeve 18 force-fitted in an opening in the rear end of the actuator arm 16. An internally threaded fitting 20 is press-fitted in an opening 22 in the end wall 11, and which fitting is provided at its upper end with a flange portion 20a, seated on top of the end wall 11, and the flange being formed with one or more tines 20b, adapted to be forced downwardly into the end wall for securing the fixture 20 against rotation. A screw 24 is loosely extended through the sleeve 18, and is threaded into the fixture 20. A washer 26 is interposed between the head of the screw 24 and the top of the actuator arm 16. By virtue of this construction the actuator arm is adapted to be freely swingable in either direction across the upwardly open end of the sound box A. Secured to the under side of the actuator arm 16, is an elongated, transversely extending bar of slate 28, which is adapted to seat against the knife-like edges formed by the upper edges of the side walls 14 of the sound box, as seen in FIGURE 4 of the drawing. The bar of slate may be secured to the actuator arm in any convenient manner. It is preferred, however, to utilize a resilient clip 30, having a pair of oppositely arranged, depending flanges 32, for frictionally embracing opposite side edges of the bar of slate 28. The clip also includes a pair of oppositely disposed, upwardly extending flanges 34, dimensioned for frictionally embracing the side edges of the actuator arm 16. By virtue of this construction, the bar of slate 28 may be adjusted lengthwise of the actuator arm for obtaining variations in tonal qualities reproduced by the sound box.

As may be seen in FIGURE 3 of the drawings, the parts are so dimensioned and related that the actuator arm is freely movable about its pivot, and the bar of slate 28, when in contact with the upper edges of the side walls 14 of the sound box, supports the outer end of the actuator arm out of contact with the front end wall 12 of the sound box, so as to insure that during the swinging movement of the actuator arm only the bar of slate is moved in frictional contact with the knife-like edges of the side walls of the sound box. By virtue of this construction, it has been found that it is possible to mechanically reproduce, very closely, the vocal call of fowls, such as wild geese.

The bottom wall 10 of the sound box, at the end opposite the pivot connection, is provided with an extension 10a, formed to constitute a hand grip by virtue of which the sound box may be properly supported in a manner so as not to impair the sound vibrations produced by the sound box when the device is being actuated. For convenience in moving the actuator arm about its pivotal mounting for causing the bar of slate to rub over the knife-like edges of the side walls of the sound box, said arm is provided with a rearward extension 16a so as to constitute a finger-grip portion, and which permits fine control of movement of the actuator arm for causing the bar of slate to frictionally engage the knife-like edges of the upper portions of the side walls of the sound box.

Although I have herein shown and described a preferred embodiment of my invention, manifestly it is capable of modification and rearrangement of parts without departing from the spirit and scope thereof. I do not, therefore, wish to be understood as limiting this invention to the precise embodiment herein disclosed, except as I may be so limited by the appended claim.

I claim:

A fowl call comprising an upwardly open, elongated sound box having a pair of side walls, an elongated actuator arm pivotally mounted at one end on top of the rear end wall of the box, said arm being swingable about its pivot over the upper edges of said side walls of the box, and an elongated bar of slate carried on the under side of and disposed transversely of said arm and seated directly upon the upper marginal edges of the side walls of the box, and means for adjustably securing said bar of slate along the length of the actuator arm, said means comprising a resilient clip formed with a pair of opposite, depending flanges for frictionally embracing the side edges of the bar of slate and a second pair of upwardly extending flanges for frictionally embracing the opposite edges of the actuator arm.

References Cited in the file of this patent

UNITED STATES PATENTS

| | | |
|---|---|---|
| 574,534 | Gibson | Jan. 5, 1897 |
| 2,511,403 | Fleener | June 13, 1950 |
| 2,606,401 | Boatwright | Aug. 12, 1952 |
| 2,720,054 | Grazier | Oct. 11, 1955 |